(12) United States Patent
Barth et al.

(10) Patent No.: US 11,359,744 B2
(45) Date of Patent: Jun. 14, 2022

(54) METHOD FOR MONITORING A MECHANICAL SYSTEM

(71) Applicant: Siemens Aktiengesellschaft, Munich (DE)

(72) Inventors: Johannes Barth, Karlsruhe (DE); Ralf Huck, Großkrotzenburg (DE)

(73) Assignee: Siemens Aktiengesellschaft, Munich (DE)

( * ) Notice: Subject to any disclaimer, the term of this patent is extended or adjusted under 35 U.S.C. 154(b) by 302 days.

(21) Appl. No.: 16/426,512

(22) Filed: May 30, 2019

(65) Prior Publication Data
US 2019/0368631 A1  Dec. 5, 2019

(30) Foreign Application Priority Data
Jun. 1, 2018  (EP) ..................................... 18175554

(51) Int. Cl.
*F16K 37/00* (2006.01)
*F16K 31/126* (2006.01)
(Continued)

(52) U.S. Cl.
CPC ........ *F16K 37/0083* (2013.01); *F16K 31/124* (2013.01); *F16K 31/128* (2013.01);
(Continued)

(58) Field of Classification Search
CPC ............. F16K 37/0083; F16K 37/0041; F16K 37/0075; F16K 37/0091; F16K 31/1221; F16K 31/1262; F16K 31/124; F16K 31/128; F15B 2211/6313; F15B 2211/6303; G05B 23/0235; G05B 23/0216; Y10T 137/8242; Y10T 137/8326
See application file for complete search history.

(56) References Cited

U.S. PATENT DOCUMENTS 6,176,247 B1  1/2001  Winchcomb et al.
2006/0032535 A1*  2/2006  Madden .............. F16K 37/0041
137/554
(Continued)

FOREIGN PATENT DOCUMENTS

CN  1815069  8/2006
CN  101255882  9/2008
(Continued)

OTHER PUBLICATIONS

Office Action dated Aug. 11, 2020 issued in Chinese Patent Application No. 201910469829.9.

*Primary Examiner* — Atif H Chaudry
(74) *Attorney, Agent, or Firm* — Cozen O'Connor

(57) ABSTRACT

A method for monitoring a system with mechanically movable parts, preferably a valve system, wherein the system is preferably part of a technical plant, in particular a production plant, and wherein the system has at least one mechanically movable part, in particular a valve, where the method comprises a) acquiring indicators, which can be used for a technical characterization of a movement procedure of the mechanically movable part, via technical devices configured for the acquisition of the indicators and b) transferring the acquired indicators to an evaluation unit arranged outside the system to determine a technical status of the system.

25 Claims, 2 Drawing Sheets

(51) Int. Cl.
*F16K 31/124* (2006.01)
*F16K 31/122* (2006.01)
*F16K 31/128* (2006.01)
*G06Q 10/00* (2012.01)

(52) U.S. Cl.
CPC ...... *F16K 31/1221* (2013.01); *F16K 31/1262* (2013.01); *F16K 37/0041* (2013.01); *F16K 37/0075* (2013.01); *F16K 37/0091* (2013.01); *G06Q 10/20* (2013.01); *Y10T 137/8242* (2015.04); *Y10T 137/8326* (2015.04)

(56) References Cited

U.S. PATENT DOCUMENTS

| | | |
|---|---|---|
| 2006/0169334 A1 | 8/2006 | Hayashi et al. |
| 2006/0266966 A1 | 11/2006 | Karte et al. |
| 2007/0034264 A1* | 2/2007 | Kunz ............... F16K 31/042 137/554 |
| 2008/0004836 A1* | 1/2008 | Tewes ............... G05B 23/0221 702/182 |
| 2008/0121290 A1 | 5/2008 | Pape et al. |
| 2010/0152908 A1 | 6/2010 | Meier et al. |
| 2010/0282990 A1 | 11/2010 | Heer |
| 2014/0190263 A1 | 7/2014 | Anderson |
| 2016/0245279 A1 | 8/2016 | Pal et al. |
| 2018/0259080 A1* | 9/2018 | Dale ............... E21B 41/0021 |
| 2019/0331143 A1 | 10/2019 | Penning et al. |

FOREIGN PATENT DOCUMENTS

| | | |
|---|---|---|
| CN | 202252307 U | 5/2012 |
| CN | 103912717 | 7/2014 |
| DE | 102005024686 | 12/2006 |
| DE | 102007034059 | 1/2009 |
| DE | 102008062290 | 6/2010 |
| DE | 102015118198 | 4/2017 |
| WO | WO99/21066 | 4/1999 |

* cited by examiner

METHOD FOR MONITORING A MECHANICAL SYSTEM

BACKGROUND OF THE INVENTION

1. Field of the Invention

The invention relates to a method for monitoring a system with mechanically movable parts.

2. Description of the Related Art

In the process industry, valves are opened with the aid of pneumatic drives and pneumatic auxiliary power, for example. In this context, spring packages in the drive ensure that the valve is closed in the event of a failure of the pneumatic auxiliary power. If one of the springs breaks, however, then the valve may no longer be safely closed in the event of a fault. Thus, the regions before and after the valve may no longer be reliably separated from one another, which may lead to serious consequences.

Valves are largely used for temporary cutting-off/opening. As a result, they are situated in an open/closed status over comparatively long periods of time, in order to only be closed/opened via a drive and pneumatic auxiliary power on demand. Due to the valve and drive remaining in their end position for a long time, the combination of valve and drive regularly tends to be stuck in an end position.

During the closing, the valve and drive have to be released from a starting position by overcoming a breakaway torque, for example, before it is guided into a closed position by a further drop in pressure and by the spring force of the spring package. Over the course of a lifecycle of the valve, the breakaway torque increases, due to wear and corrosion of the drive.

If the breakaway torque is greater than the spring force of the spring package, then the valve may no longer be closed despite the drop in pressure. Here, the cut-off procedure may no longer be performed safely, whereby significant damage may occur. During the opening, the same phenomena arise in an analogous manner, wherein the breakaway torque may be substantially greater, in particular with metallically sealing valves, meaning that the maximum pressure of the pneumatic auxiliary power with a given membrane surface in the drive is no longer sufficient to open the valve, which likewise may lead to considerable damage.

A further pattern of damage results from a leak in the body of the valve. This may result in chemically aggressive or highly reactive media escaping, where applicable, which may cause damage.

Moreover, the slip stick effect (a jerking) may arise in a valve. This effect represents the beginning of an incipient immovability of the drive.

The pneumatic auxiliary power is generally connected via magnetic valves fitted to the drive. In turn, the magnetic valves are typically connected via 24V digital outputs of central controllers or process control systems. Barring any present mechanical end position detectors, in the traditional construction, no diagnostics apparatuses have been present at switching valves to date.

The previously explained patterns of damage in valves typically used in the process industry, therefore, cannot be detected, or can only be detected with a comparatively high level of expense. A safe operation of valves, in particular on/off valves, has therefore only been possible to date via regular checking and maintenance or by redundant installations (one or more redundant valves) or by overdimensioning of individual elements of the valves, for example, by using more powerful springs, or by additional and therefore uneconomical diagnostics apparatuses from the field of regulating valves (e.g., what are known as positioners, which may exceed the investment costs of a switching valve many times over).

In the absence of suitable, cost-effective diagnostics instruments, the valves are disassembled every five years for maintenance purposes, for example, which causes comparatively high service costs and plant shutdowns. Moreover, it often becomes apparent that a considerably longer maintenance interval may have been sufficient.

In order to keep the valves functioning, and to counteract an increase in the breakaway torque, the valves may be briefly partially or completely opened/closed on a regular basis (partial stroke or full stroke test). In order to perform this in an automated manner, the aforementioned positioner may be used. The use of the positioner requires a considerably more complex position regulation compared to magnetic valves, as well as more elaborate actuation technology. In the case of a retrofit, high conversion expenses are also called for. This leads to this technology being virtually unused.

DE 10 2015 118 198 A1 discloses one example for such monitoring. In this document, a monitoring unit for a final control device is disclosed, which comprises a control valve, a pneumatic drive activating the control valve, and a positioner actuating the actuating drive.

Known from WO 99/21066 A1 is a positioner for a final control device of a valve, which has a diagnostics unit.

DE 10 2005 024 686 A1 furthermore discloses a final control device for activating a valve with a pneumatic drive and a diagnostics function.

Moreover, it is known to be possible to use additional sensors/actuators, which are connected to one another by means of fieldbuses and to the control system of a technical plant, in particular a process plant. This, however, requires a high level of expense for additional material, which would not be necessary for the actual process automation. Additional local information relating to a status of the valves can therefore only be obtained with a high additional expense.

It is also known to acquire a pressure gradient in a valve or noises, which occur during an opening or closing procedure of the valve and are transferred by structure-borne or airborne sound, by a specific diagnostics apparatus, in order to obtain safety-relevant data relating to the valve. This data, however, may only be used to an insufficient extent for characterizing a status of the valve.

SUMMARY OF THE INVENTION

It is the object of the present invention to provide a method for monitoring a system with mechanically movable parts, which can be performed with comparatively little material and required expenditure and which enables an extensive acquisition of a technical status of the system.

This and other objects and advantages are achieved in accordance with the invention by a method for monitoring a system with mechanically movable parts, which is preferably part of a technical plant, in particular a production plant, where the system has at least one mechanically movable part.

In one method of the type described in the introduction, the object is achieved in accordance with the invention in that indicators are acquired, which can be used for a technical characterization of a movement procedure of the mechanically movable part. In this context, the acquisition of the indicators occurs via a technical device configured for acquisition of the indicators. The acquired indicators are subsequently transferred to an evaluation unit arranged outside the system, in order to determine a technical status of the system.

The system is preferably part of a technical plant, in particular a process plant. In this context, this may in particular involve plants from the process industry, such as a chemical, pharmaceutical or petrochemical plant, or a plant from the food and beverage industry. This also, however, includes any plants from the production industry, such as factories in which cars or goods of all kinds are produced. Technical plants, which are suitable for performing the method in accordance with the invention, may also come from the field of power generation. Wind turbines, solar plants or power stations for generating power are likewise included by the term of technical plant.

The evaluation unit may be arranged in an external cloud environment outside the technical plant, or may be part of such a cloud environment. A cloud environment is understood in this context to be a network of servers, which are arranged in a distributed manner, but are connected to one another. Here, the servers are configured to store and manage data, execute applications as well as provide various content and services online. The indicator data stored in the cloud environment can be accessed online, meaning that the technical plant itself also has access to a central data archive in the cloud environment via the Internet. The cloud environment may also be formed at the plant as an "on-premise private cloud", if access to the Internet is to be avoided for security reasons.

A technical status may be, for example, the status "not operational" or "operational to a limited extent" or "fully operational". Furthermore, the technical status may comprise a performance of the system, in particular a valve system and, for example, may contain information regarding the speed at which the mechanically movable part moves (e.g., closes or opens), or which latency times arise.

In principle, the method may be applied to all applications, in which wear to individual parts leads to an increased service requirement or unplanned downtimes. Examples of such applications are motors, gear units, pumps, or conveyor belts. The system with mechanically movable parts preferably involves a valve system. This comprises at least one valve, which is configured to perform an opening and a closing procedure.

The technical device used for acquiring the indicators may be realized on the basis of the evaluation of the data outside the system in a simple manner with minimal hardware outlay. The evaluation unit may advantageously monitor a plurality of systems and, in this context, categorize the systems, for example, according to valve type, process conditions and location in a technical plant. As a result, individual valve types, which in some circumstances have frequent failure times, can be identified in a simple manner and corresponding measures may be introduced. By categorizing the valve systems monitored by the evaluation unit, it is thus possible for systematic errors in the valve systems, which regularly arise in a particular type of valve system, to be identified and corrected in a simpler manner.

The technical device configured for the acquisition may also preferably involve sensors. The indicators may involve a structure-borne sound value and/or an airborne sound value, a pressure value within the valve system. In this context, the sensors advantageously may be for configured to acquire the structure-borne sound value, the airborne sound value and/or the pressure value.

Particularly preferably, in addition to the valve, the valve system comprises a pilot valve and a drive. The pilot valve may, for example, be a magnetic valve or a hydraulically operated valve and is configured to control the drive. The drive is configured to activate the valve and may, for example, be a pneumatic or an electric drive.

In one preferred embodiment of the method, the sensors have an autonomous power source for providing a supply power necessary for the acquisition of the indicators. As a result, the method can be performed without regard to an external (additionally necessary or already present) power source.

As an alternative or in addition, the sensors may have an electrical connection to an electrical supply network which supplies the valve system. For example, the sensors may use a 24 Volt line to the valve system, which is used for transferring a switching signal for the valve system, as a power source. Advantageously, in this context the sensors have a cache, in order to be able to respond to voltage failures or voltage interruptions in the electrical supply network.

Particularly preferably, an idle state of the sensors is ended by a switching procedure of the valve system, in order to initiate the acquisition of the indicators. In other words, the sensors are "woken" from an energy-saving mode by the switching procedure. The sensors are then only used when they are also actually required. As a result, the sensors can be operated in a more energy-efficient manner.

Advantageously, the transfer of the acquired indicators to the evaluation unit is linked with an identification of an opening procedure and/or closing procedure of the valve, the drive and/or the pilot valve, in order to minimize a communication effort for the evaluation unit. In other words, the acquired data is then only transferred to the evaluation unit, even if a switching procedure (opening or closing) actually occurs in the valve system.

The transference of the acquired indicators to the evaluation unit preferably occurs wirelessly (by radio, for example). Although a wired transference is likewise possible as part of the method in accordance with the invention, it necessitates a higher expense, however, by virtue of the wiring having to be installed.

In an advantageous embodiment of the invention, the sensors are configured to identify changes in an electrical supply network which supplies the valve system, in order to identify a start point of a closing procedure or an opening procedure of the valve system. As a result, the closing procedure and the opening procedure can be identified in a more secure manner and misinterpretations can be avoided. For example, ambient noise having no relation to the actual opening procedure or closing procedure can be excluded from consideration.

Preferably, the acquired indicators are compared with limit values recorded in the evaluation unit, in order to determine the technical status of the valve system. In this context, the limit values may be specific for a particular type of valve system, or may possess general validity, for example, for any type of valve system.

Additionally, a temporal course of the acquired indicators may be tracked by the evaluation unit to identify shifts in the technical status of the valve system. Here, the evaluation unit can ascertain what is known as a trend, and make predictions as to a future technical status of the valve system when the recorded limit valves are also reviewed.

The temporal course of the acquired indicators may additionally be used to dynamically adapt the limit values recorded in the evaluation unit. For example, average values of the indicators over a certain previous time span before a failure of a valve system may be taken into consideration, in order to draw conclusions regarding the validity of the limit values therefrom. In order words, the method may be self-learning.

In an advantageous embodiment of the method, the technical status of the valve system ascertained by the evaluation unit may be transferred to a unit, which is embodied and intended to initiate maintenance measures for the valve system. The unit may be a computer-aided planning tool, which initiates and coordinates maintenance measures in a fully automated manner.

Particularly preferably, the indicators are already acquired and transferred to the evaluation unit during a manufacturing process of the valve system. The indicators may then be used by the evaluation unit as reference values. With the aid of these reference values, it is possible, for example, to automatically check, during an installation of the valve system into a technical plant, whether the installation has occurred correctly. Moreover, the reference indicators may be compared with indicators which have been ascertained at a following time, in order to be able to determine a technical status of the valve system more precisely and to take measures at an earlier time.

The indicators may be derived from a sequence of structure-borne, airborne or pressure characteristics, or a combination of the same, which are characteristic of the valve and/or the drive.

Particularly preferably, the status information derived from the indicators can be correlated with a categorization of the valves. In this context, the valves to be monitored are allocated particular categories, in order to be able to allocate generalizable trends to the valve categories. Here, categories are formed by individual or combinations of the groups listed in the following by way of example: Valve type, process conditions (e.g., pressure, flow rate, temperature), location of the user (e.g., plant identification), process type of the user (e.g., ethylene plant). The categorization occurs in this context by the user or, where possible, the manufacturer of the valve. The category fields are stored in the external evaluation unit (on-premise or cloud), meaning that valves can then be sorted/searched/evaluated accordingly.

Particularly preferably, the categorization is enhanced by a self-learning system. Here, the maintenance statuses derived from service measures (e.g., gut, maintenance required, defective) are added to the categorization in the evaluation unit by the operator of the plant. By comparing the history of the indicators with the categories and the maintenance statuses, in the presence of a significant number of maintenance statuses fed-back per category, it is possible to identify in a surprisingly simple manner which indicator trend or combination of indicator trends will lead to a defect (self-learning system).

With the foregoing information, the evaluation unit may then predict a possible maintenance requirement automatically and warn the operator before they perform a planned maintenance. In this way, early failures that emerge before the next planned maintenance can be identified and unplanned downtimes can be avoided.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above-described properties, features and advantages of this invention and the manner in which these are achieved will now be described more clearly and intelligibly in conjunction with the following description of the exemplary embodiment, which will be described in detail making reference to the drawings, in which.

DETAILED DESCRIPTION OF THE EXEMPLARY EMBODIMENTS

Figure 1:
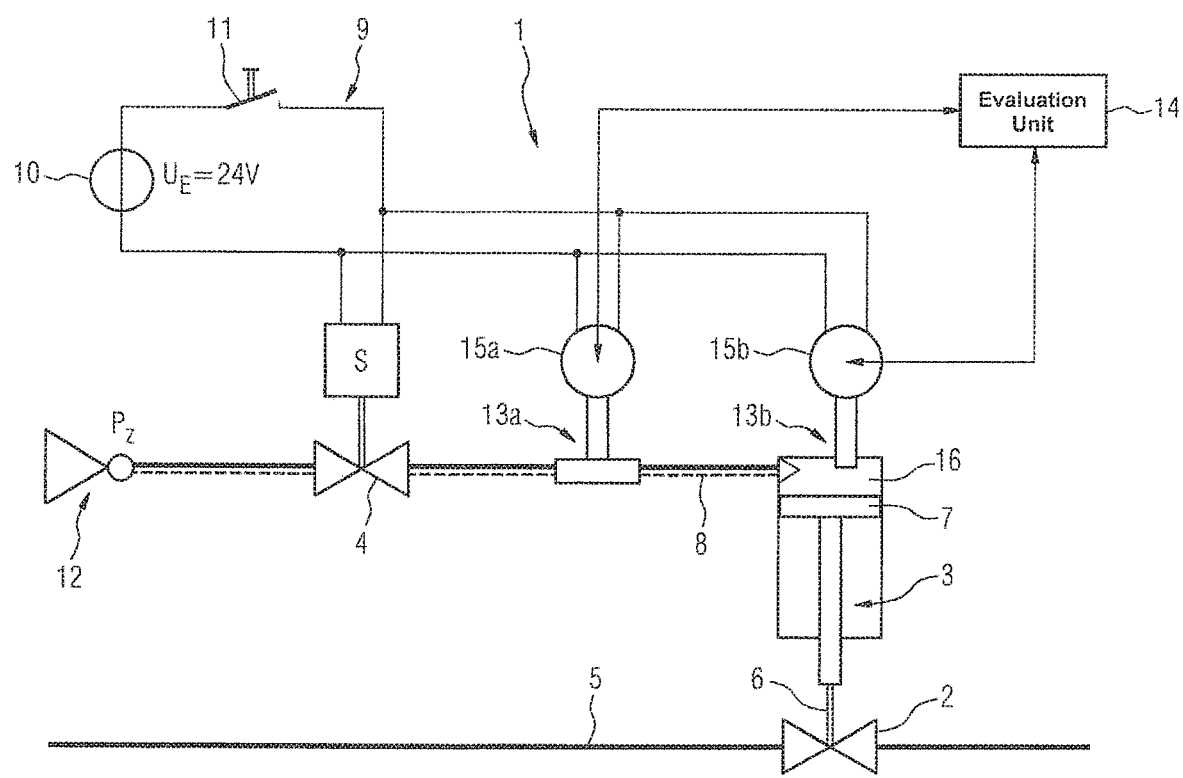
FIG. 1 shows an exemplary valve system in which the method in accordance with the invention is implemented.

FIG. 1 shows a valve system 1. The valve system 1 comprises a process valve 2, a pneumatic drive 3 and a pilot valve 4.

A medium flowing through a process line 5 is controlled by the process valve 2. The process valve 2 involves an open/close valve (on/off valve), which can be switched between the two statuses "valve open" and "valve closed".

The switching of the process valve 2 occurs via the pneumatic drive 3. A membrane 7 coupled with a valve spindle 6 of the process valve 2 is moved in the pneumatic drive 3 in a known manner via compressed air guided through a compressed air line 8. In FIG. 1, the pneumatic drive 3 is shown as a representative of the conventional, known forms of embodiments without resetting springs. The process valve 2 may have all known configurations, such as "normally open" or "normally close", "single-acting" or "double-acting".

The pilot valve 4 is supplied with electrical power via an electrical supply network 9. The electrical supply consists of, in a simplified representation, a voltage source 10, which provides a DC voltage at 24 V, and a pushbutton 11, for closing a voltage circuit and actuating the pilot valve 4. Here, the pushbutton 11 is to be considered as a representative of all conventional actuation/regulation possibilities, which are available in the context of a process control system of a technical plant.

The pilot valve 4 controls (or regulates) the flow rate of compressed air, which flows from a compressed air source 12 via the compressed air line 8 into the pneumatic drive 3.

The valve system 2 has a first sound/pressure acquisition sensor 13a and a second sound/pressure acquisition sensor 13b. The first sound/pressure acquisition sensor 13a has a first data logger 15a, the second sound/pressure acquisition sensor 13b has a second data logger 15b. The first sound/pressure acquisition sensor 13a is arranged in the compressed air line 8 or it is a component of the compressed air line 8, meaning that the compressed air, before flowing into the pneumatic drive 3, flows through the first pressure acquisition sensor 13a, which ascertains a pressure value in the compressed air line 8 and forwards it to the first data logger 15a. The sound/pressure acquisition sensors are to be understood as exemplary. They may optionally be used on an alternative basis or even together. Furthermore, it is also possible to use sensors that acquire only the sound or only the pressure. In this context, the sensor to be chosen is dependent upon the indicators necessary for the system to be monitored, with suitable indication depth.

Here, the sound/pressure acquisition sensor 13*a* may be integrated into an existing valve system 1 retrospectively in a simple manner, without having to engage into the interior of the pneumatic drive 3.

The second sound/pressure acquisition sensor 13*b* is arranged in a pressure chamber 16 of the pneumatic drive 3. The second data logger 15*b* associated therewith is arranged outside the pneumatic drive 3. The advantage of the pressure acquisition sensor 13*b* is that the measurement of the pressure value can occur directly in the pneumatic drive 3.

When a pure sound sensor 13*a*, 13*b* is used, this results in another simplification, as a structure-borne or airborne sound measurement can be designed as a ClampOn system, i.e., without opening the pneumatics or hydraulics.

The data loggers 15*a*, 15*b* are each connected to the electrical supply network 9 in a parallel connection with the pilot valve 4. Thus, the supplying of the data loggers 15*a*, 15*b* or the pressure acquisition sensors 13*a*, 13*b* connected thereto can be ensured.

The sound/pressure acquisition sensors 13*a*, 13*b* are configured to acquire a pressure gradient of the pneumatic drive 3 during a closing procedure or an opening procedure of the process valve 2 as an indicator for the technical characterization of the drive 3 or of the valve 2.

In this context, the expression "pressure gradient of the pneumatic drive 3" can mean that the pressure is measured directly in a pressure chamber 16 of the drive 3. The meaning of the expression equally includes, however, the pressure being measured in the compressed air line 8. In other words, this means that a pressure value is already acquired before the air flows into the pressure chamber 16 of the pneumatic drive 3. In the case of a pure sound measurement, in contrast, use can be made of the fact that due to the sound propagation in the entire system, all characteristic indicators are able to be acquired at one point.

The data or indicators acquired by the sound/pressure acquisition sensors 13*a*, 13*b* are transferred to an evaluation unit 14 arranged outside the valve system 1. The evaluation unit 14 is, in the present exemplary embodiment, arranged outside the valve system 1, but within a technical plant (not shown) (on-premise private cloud). Optionally, the evaluation unit may also be arranged outside the plant (Internet-based cloud). The evaluation unit 14 determines, inter alia, based on the indicators transferred to it, a technical status of the valve system 1.

In one exemplary embodiment, the evaluation unit 14 may not only receive data from the sound/pressure acquisition sensors 13*a*, 13*b*, but also transfer data, control commands, etc. to it. In other words, a bidirectional connection between the evaluation unit 14 and the sound/pressure acquisition sensors 13*a*, 13*b* can be installed. The connection can generally be wireless or wired. A wireless connection is preferred, however, as no wiring expenses are accrued.

Figure 2:
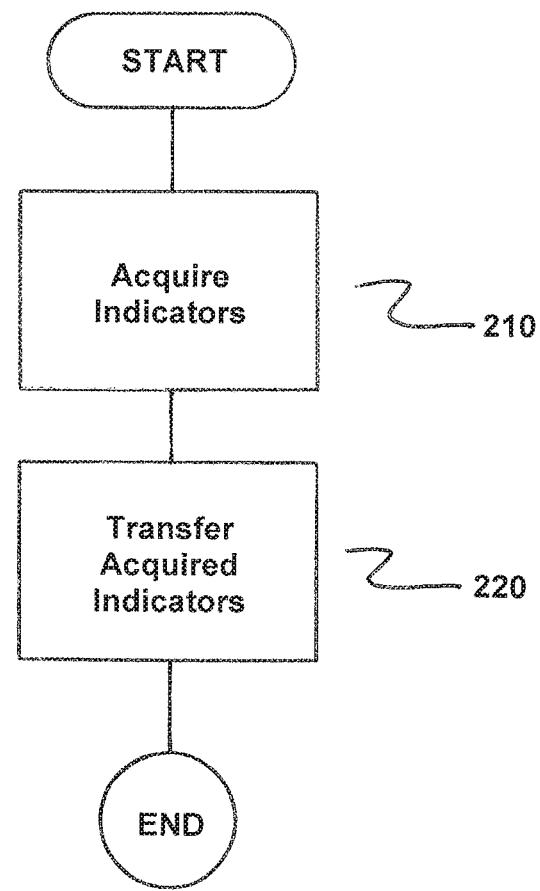
FIG. 2 is a flowchart of the method in accordance with the invention.

FIG. 2 is a flowchart of the method for monitoring a system 1 with mechanically movable parts, where the system 1 forms part of a technical plant, and the system 1 includes at least one mechanically movable part 2.

The method comprises acquiring indicators, which can be used for a technical characterization of a movement procedure of the mechanically movable part 2, via technical device 13*a*, 13*b* configured to acquire the indicators, as indicated in step 210.

Next, the acquired indicators are transferred to an evaluation unit 14 arranged outside the system 1 to determine a technical status of the system 1, as indicated in step 220.

Although the invention has been illustrated and described in detail with the preferred exemplary embodiment, the invention is not restricted by the examples disclosed and other variations can be derived therefrom by a person skilled in the art without departing from the protective scope of the invention.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for monitoring a system with mechanically movable parts to initiate maintenance measures for the system based on a determined technical status of the system, the system forming part of a technical plant, and the system including at least one mechanically movable part, the method comprising:

a) acquiring indicators, which are usable for a technical characterization of a movement procedure of the mechanically movable part, via a technical device configured to acquire the indicators;

b) transferring the acquired indicators to an evaluation unit arranged in an external cloud environment outside the system of the technical plant to determine the technical status of the system; and c) initiating maintenance measures for the system based on the determined technical status of the system;

wherein the indicators are transferred from a plurality of systems into the evaluation unit; and wherein the evaluation unit undertakes a categorization of the systems allocated to the evaluation unit to identify systematic errors in the systems; and wherein the evaluation unit compares indicators which have been acquired and recorded in the evaluation unit with maintenance statuses to determine, from a change in a maintenance status, associated limit values for one of (i) the indicators and (ii) a combination of indicators for a respective category of the system, and to record said associated limit values in the evaluation unit.

2. The method as claimed in claim 1, wherein a maintenance status of the at least one mechanically movable part is transferred to the evaluation unit.

3. The method as claimed in claim 2, wherein the evaluation unit compares indicators which have been acquired and recorded in the evaluation unit with maintenance statuses to determine, from a change in a maintenance status, associated limit values for one of (i) the indicators and (ii)

a combination of indicators for a respective category of the system, and to record said associated limit values in the evaluation unit.

4. The method as claimed in claim 1, wherein one of (i) the limit values for the indicators and (ii) the combination of indicators for each respective category of the system are continuously adapted by the evaluation unit to automatically improve a selectivity of calculated limit values.

5. The method as claimed in claim 1, wherein, in addition to the at least one mechanically movable part, the valve system comprises a pilot valve and a drive, wherein additionally indicators are acquired by the technical device configured for acquisition, which are usable for a technical characterization of at least one of (i) an opening procedure and (ii) closing procedure of the pilot valve and the drive; and wherein the additionally acquired indicators are transferred to the evaluation unit to determine a status of the valve system.

6. The method as claimed in claim 5, wherein the transfer of the acquired indicators to the evaluation unit is linked with an identification of at least one of (i) an opening procedure and (ii) a closing procedure of the at least one of (a) the at least one mechanically movable part, (b) the drive and (c) the pilot valve to minimize a communication load of the evaluation unit.

7. The method as claimed in claim 5, wherein the indicators are derived from a characteristic sequence of one of (i) structure-borne, (ii) airborne and (iii) pressure characteristics of at least one of (i) the mechanically movable part and (ii) the drive and (iii) the pilot valve.

8. The method as claimed in claim 1, wherein the acquired indicators relate to at least one of (i) a structure-borne sound value, (ii) an airborne sound value and (iii) a pressure value within the system; wherein the technical device configured for the acquisition of at least one of (i) the structure-borne sound, (ii) the airborne sound and (iii) the pressure value comprise sensors.

9. The method as claimed in claim 8, wherein the sensors include at least one of (i) an autonomous power source for providing a supply power necessary for the acquisition of the indicators and (ii) an electrical connection to an electrical supply network supplying the system.

10. The method as claimed in claim 9, wherein an idle state of the sensors is terminated by a switching procedure of the system to initiate the acquisition of the indicators.

11. The method as claimed in claim 9, wherein the sensors are further configured to identify changes in an electrical supply network which supplies the system to identify a start point of one of (i) a closing procedure and (ii) an opening procedure of the system.

12. The method as claimed in claim 8, wherein an idle state of the sensors is terminated by a switching procedure of the system to initiate the acquisition of the indicators.

13. The method as claimed in claim 12, wherein the sensors are further configured to identify changes in an electrical supply network which supplies the system to identify a start point of one of (i) a closing procedure and (ii) an opening procedure of the system.

14. The method as claimed in claim 8, wherein the sensors are further configured to identify changes in an electrical supply network which supplies the system to identify a start point of one of (i) a closing procedure and (ii) an opening procedure of the system.

15. The method as claimed in claim 1, wherein the transfer of the acquired indicators to the evaluation unit occurs wirelessly.

16. The method as claimed in claim 1, wherein the technical status of the valve system ascertained by the evaluation unit is transferred to a unit which is configured to initiate the maintenance measures for the system.

17. The method as claimed in claim 1, wherein the indicators are acquired and transferred to the evaluation unit during a manufacturing process of the valve system to serve as a reference for subsequent acquisitions of the indicators.

18. The method as claimed in claim 1, wherein the mechanically movable parts comprise a valve system.

19. The method as claimed in claim 1, wherein the technical plant comprises a production plant.

20. The method as claimed in claim 1, wherein the at least one mechanically movable part comprises a valve.

21. A method for monitoring a system with mechanically movable parts to initiate maintenance measures for the system based on a determined technical status of the system, the system forming part of a technical plant, and the system including at least one mechanically movable part, the method comprising:
 a) acquiring indicators, which are usable for a technical characterization of a movement procedure of the mechanically movable part, via a technical device configured to acquire the indicators;
 b) transferring the acquired indicators to an evaluation unit arranged in an external cloud environment outside the system of the technical plant to determine the technical status of the system; and
 c) initiating maintenance measures for the system based on the determined technical status of the system;
  wherein the indicators are transferred from a plurality of systems into the evaluation unit; and wherein the evaluation unit undertakes a categorization of the systems allocated to the evaluation unit to identify systematic errors in the systems;
  wherein a maintenance status of the at least one mechanically movable part is transferred to the evaluation unit; and
  wherein the evaluation unit compares indicators which have been acquired and recorded in the evaluation unit with maintenance statuses to determine, from a change in a maintenance status, associated limit values for one of (i) the indicators and (ii) a combination of indicators for a respective category of the system, and to record said associated limit values in the evaluation unit.

22. A method for monitoring a system with mechanically movable parts to initiate maintenance measures for the system based on a determined technical status of the system, the system forming part of a technical plant, and the system including at least one mechanically movable part, the method comprising:
 a) acquiring indicators, which are usable for a technical characterization of a movement procedure of the mechanically movable part, via a technical device configured to acquire the indicators;
 b) transferring the acquired indicators to an evaluation unit arranged in an external cloud environment outside the system of the technical plant to determine the technical status of the system; and
 c) initiating maintenance measures for the system based on the determined technical status of the system
  wherein a maintenance status of the at least one mechanically movable part is transferred to the evaluation unit; and
  wherein the evaluation unit compares indicators which have been acquired and recorded in the evaluation unit with maintenance statuses to determine, from a change in a maintenance status, associated limit values for one of (i) the indicators and (ii) a combination of indicators for a respective category of the system, and to record said associated limit values in the evaluation unit.

23. A method for monitoring a system with mechanically movable parts to initiate maintenance measures for the system based on a determined technical status of the system, the system forming part of a technical plant, and the system including at least one mechanically movable part, the method comprising:
   a) acquiring indicators, which are usable for a technical characterization of a movement procedure of the mechanically movable part, via a technical device configured to acquire the indicators;
   b) transferring the acquired indicators to an evaluation unit arranged in an external cloud environment outside the system of the technical plant to determine the technical status of the system; and
   c) initiating maintenance measures for the system based on the determined technical status of the system;
      wherein the acquired indicators relate to at least one of (i) a structure-borne sound value, (ii) an airborne sound value and (iii) a pressure value within the system; wherein the technical device configured for the acquisition of at least one of (i) the structure-borne sound, (ii) the airborne sound and (iii) the pressure value comprise sensors; and
      wherein the sensors are further configured to identify changes in an electrical supply network which supplies the system to identify a start point of one of (i) a closing procedure and (ii) an opening procedure of the system.

24. A method for monitoring a system with mechanically movable parts to initiate maintenance measures for the system based on a determined technical status of the system, the system forming part of a technical plant, and the system including at least one mechanically movable part, the method comprising:
   a) acquiring indicators, which are usable for a technical characterization of a movement procedure of the mechanically movable part, via a technical device configured to acquire the indicators;
   b) transferring the acquired indicators to an evaluation unit arranged in an external cloud environment outside the system of the technical plant to determine the technical status of the system; and
   c) initiating maintenance measures for the system based on the determined technical status of the system;
      wherein the acquired indicators relate to at least one of (i) a structure-borne sound value, (ii) an airborne sound value and (iii) a pressure value within the system; wherein the technical device configured for the acquisition of at least one of (i) the structure-borne sound, (ii) the airborne sound and (iii) the pressure value comprise sensors;
      wherein the sensors include at least one of (i) an autonomous power source for providing a supply power necessary for the acquisition of the indicators and (ii) an electrical connection to an electrical supply network supplying the system; and
      wherein the sensors are further configured to identify changes in an electrical supply network which supplies the system to identify a start point of one of (i) a closing procedure and (ii) an opening procedure of the system.

25. A method for monitoring a system with mechanically movable parts to initiate maintenance measures for the system based on a determined technical status of the system, the system forming part of a technical plant, and the system including at least one mechanically movable part, the method comprising:
   a) acquiring indicators, which are usable for a technical characterization of a movement procedure of the mechanically movable part, via a technical device configured to acquire the indicators;
   b) transferring the acquired indicators to an evaluation unit arranged in an external cloud environment outside the system of the technical plant to determine the technical status of the system; and
   c) initiating maintenance measures for the system based on the determined technical status of the system;
      wherein the acquired indicators relate to at least one of (i) a structure-borne sound value, (ii) an airborne sound value and (iii) a pressure value within the system; wherein the technical device configured for the acquisition of at least one of (i) the structure-borne sound, (ii) the airborne sound and (iii) the pressure value comprise sensors;
      wherein an idle state of the sensors is terminated by a switching procedure of the system to initiate the acquisition of the indicators; and
      wherein the sensors are further configured to identify changes in an electrical supply network which supplies the system to identify a start point of one of (i) a closing procedure and (ii) an opening procedure of the system.

* * * * *